United States Patent
DeLew et al.

(10) Patent No.: US 7,660,333 B2
(45) Date of Patent: Feb. 9, 2010

(54) METHOD AND APPARATUS FOR DETECTING AND COMPENSATING FOR JITTER IN A COMMUNICATIONS NETWORK

(75) Inventors: David A. DeLew, Rohnert Park, CA (US); Vinita Gupta, Novato, CA (US); Robert S. Larvenz, Rohnert Park, CA (US); Joseph Golja, Petaluma, CA (US)

(73) Assignee: Tellabs Petaluma, Inc., Naperville, IL (US)

( * ) Notice: Subject to any disclaimer, the term of this patent is extended or adjusted under 35 U.S.C. 154(b) by 422 days.

(21) Appl. No.: 11/811,723

(22) Filed: Jun. 12, 2007

(65) Prior Publication Data
US 2008/0225898 A1   Sep. 18, 2008

Related U.S. Application Data

(60) Provisional application No. 60/906,380, filed on Mar. 12, 2007.

(51) Int. Cl.
*H04J 3/06* (2006.01)
*H04J 3/00* (2006.01)
*H04L 7/00* (2006.01)

(52) U.S. Cl. ........................ 370/516; 370/350; 370/498; 370/503; 375/354; 398/33

(58) Field of Classification Search ......... 370/232–282, 370/350, 389, 412, 462, 468, 493, 498, 503, 370/512–517; 375/354, 355, 346, 365; 398/346–365, 398/33
See application file for complete search history.

(56) References Cited

U.S. PATENT DOCUMENTS

| | | | |
|---|---|---|---|
| 5,343,465 A | 8/1994 | Khalil | |
| 6,466,589 B1 * | 10/2002 | Chou | 370/518 |
| 6,804,256 B2 | 10/2004 | Chang | |
| 7,006,842 B2 | 2/2006 | Bi et al. | |
| 2002/0057713 A1 * | 5/2002 | Bagchi et al. | 370/468 |
| 2002/0163932 A1 * | 11/2002 | Fischer et al. | 370/465 |
| 2006/0013138 A1 * | 1/2006 | Haran et al. | 370/236 |
| 2007/0003282 A1 | 1/2007 | Boyd et al. | |

\* cited by examiner

*Primary Examiner*—Afsar M. Qureshi
(74) *Attorney, Agent, or Firm*—Hamilton, Brook, Smith & Reynolds, P.C.

(57) ABSTRACT

Jitter in a clock signal can cause communications faults in communications networks, such as in networks in which downstream nodes use recovered clock signals as timing for upstream communications. An embodiment of the present invention detects and compensates for jitter in a network by recovering a reference clock associated with communications signals between nodes, such as an Optical Line Terminal (OLT) and Optical Network Terminal (ONT) in a Passive Optical Network (PON). A local clock is synchronized with the reference clock. Jitter induced faults may be detected and compensated for by increasing the synchronization rate, then decreasing the synchronization rate until jitter induced faults begin to occur. A loss or change in a rate of communications errors occurring as a function of the synchronization rate may be monitored and reported to a system operator. Compensating for jitter by adjusting the synchronization rate provides for robust communications between network nodes.

24 Claims, 6 Drawing Sheets

METHOD AND APPARATUS FOR DETECTING AND COMPENSATING FOR JITTER IN A COMMUNICATIONS NETWORK

RELATED APPLICATION

This application claims the benefit of U.S. Provisional Application No. 60/906,380, filed on Mar. 12, 2007. The entire teachings of the above application are incorporated herein by reference.

BACKGROUND OF THE INVENTION

A communications network, such as a passive optical network (PON), transmits downstream communications signals from an optical line terminal (OLT) to an optical network terminal (ONT). The downstream communications signals include reference clock signal information. The ONT recovers the reference clock signal and transmits upstream communications signals to the OLT based on the recovered clock signal.

An OLT and/or an ONT can malfunction in such a way that its clock output signal has too high a jitter level. This malfunction can make it difficult for the receiver of that signal, either the ONT or OLT, to communicate. Excessive clock jitter may also result in intermittent communications errors which can be difficult to detect and compensate.

SUMMARY OF THE INVENTION

A method for detecting and compensating for jitter in a communications network according to an example embodiment of the invention may include recovering a reference clock signal associated with internode communications using a local clock signal. The example embodiment method may include adjusting a rate of synchronizing the local clock signal with the reference clock signal associated with the internode communications, and monitoring whether a loss of communications or a change in a rate of communications errors of the internode communications occurs as a function of the rate of synchronizing the local clock signal. The example embodiment method may further include reporting a loss of communications or a change in the rate of communications errors occurring as a function of the rate of synchronizing the local clock signal.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the invention.

DETAILED DESCRIPTION OF THE INVENTION

A description of example embodiments of the invention follows.

In a passive optical network (PON), an optical splitter/combiner may be used to allow a single optical fiber to serve multiple premises. In an example PON system, an optical line terminal (OLT) may transmit a single stream of downstream data using a common optical wavelength to multiple optical network terminals (ONTs). The single stream of data contains data for all the ONTs and is seen by all the ONTs. Each ONT will read only the data intended for that particular ONT based on ONT identification information embedded within the data. Encryption may be used to prevent unauthorized ONTs from reading data intended for other ONTs.

The ONTs transmit upstream communications using a protocol such as time division multiple access (TDMA). To prevent data collisions, the OLT may range the ONTs to provide time slot assignments for the upstream communications. Ranging allows the OLT to compensate for the different physical path length distances between the OLT and the plurality of ONTs. Thus, communications signal from each ONT are assigned a time slot during which the OLT will provide a 'grant' that allows the ONT access to a particular time slot. Examples of various PON architectures include Broadband PON (BPON) described in International Telecommunications Union-Telecommunication (ITU-T) G.983, and Gigabit PON (GPON) described in ITU-T G.984.

To reduce errors and collusions, and thereby by improving quality of service, timing signals between the OLT and the ONTs should be closely synchronized. Typically, reference clock information is embedded in the downstream communications. The ONT uses this reference clock signal to derive a local clock signal synchronous with the reference clock. The ONT may use the local clock to recover data and other overhead information embedded within the downstream communications signals. The ONT will also use the local clock signal to transmit upstream communications signals back to the OLT. The reference clock and the local clock may be resynchronized to ensure communications signals accurate transmitted between the OLT and the ONTs.

Because of the synchronous timing requirements between the OLT and the ONTs, excessive jitter within a clock signal may have an adverse impact on communications resulting in intermittent errors or even a complete communications failure. Jitter may be caused by a number of sources such as temperature, component variations, faulty connectors, etc. Clock jitter may also cause standard ranging algorithms, such as is described in ITU-T G.983.1, to fail to establish communications.

In current PON systems, it is difficult and costly to determine if communications errors are due to excessive clock signal jitter. Existing error techniques, such as those described in the aforementioned PON protocols, may not detect malfunctions due to excessive jitter or if detected (e.g., system failure) they may not be identified as such. Manual troubleshooting techniques often require interrupting the PON. For example, a service technician may need to disconnect ONTs from the optical distribution network (ODN) to determine if there is a single OLT or ONT that has the problem and which OLT or ONT is the source of the problem. Alternatively, or in addition, the service technician may have to disconnect the ODN from the OLT and examine the ODN using additional test equipment. However, this does not identify the identity of the problem ONT, if there is one, nor does it allow correct communications with the ONTs.

Accordingly, what is useful is a method or corresponding apparatus for detecting and compensating for jitter in a communications system.

Jitter tolerance as used herein, describes a clock signal's ability to tolerate jitter variations and still properly transmit and receive communications signals. A 'wide' jitter tolerance allows a clock signal to tolerate a higher level of jitter and, conversely, a clock signal with a 'narrow' jitter tolerance will tolerate a lower level of jitter. A jitter tolerance setting as used herein, refers to the rate or frequency at which a local clock is synchronized with a reference clock. A 'wide' or 'fast' jitter tolerance setting increases the rate at which the local clock is synchronized with a reference clock and a 'narrow' or 'slow' jitter tolerance setting reduces the rate at which the local clock is synchronized with a reference clock. That is, a wide setting synchronizes the clocks more often, and a narrow setting synchronizes the clocks less often. The synchronization rate may be changed, for example, by issuing a Physical Layer Operations, Administration and Maintenance (PLOAM) message.

In an example embodiment of the invention, a method for detecting and compensating for jitter may include synchronizing a local clock signal with a reference clock signal associated with communications between network nodes. A reference clock signal associated with internode communications is recovered using a local clock signal, then adjusting a rate of synchronizing the local clock signal with the reference clock signal associated with the internode communications. Further monitoring whether a loss of communications or a change in a rate of communications errors of the internode communications occurs as a function of the rate of synchronizing the local clock signal and reporting a loss of communications or a change in the rate of communications errors occurring as a function of the rate of synchronizing the local clock signal.

The rate of synchronizing may include decreasing or increasing the rate of synchronizing. The synchronizing can be self-initiated in a downstream node. The downstream node may be an ONT receiving the internode communications from an OLT. Adjusting the rate of synchronizing in one of the nodes may include adjusting the rate of synchronizing in response to a signal from the other node.

Alternatively, the method may include, increasing the rate of synchronizing before ranging network nodes conducting the internode communications, and decreasing the rate of synchronizing after ranging. Reporting a loss of communications or a change in the rate of communications errors may include transmitting a message or alert to a service provider. The reference clock signal may be recovered from the internode communications or may be transmitted independently. Further, the reference clock signal may be defined by a rate of receiving the internode communications.

Figure 1:
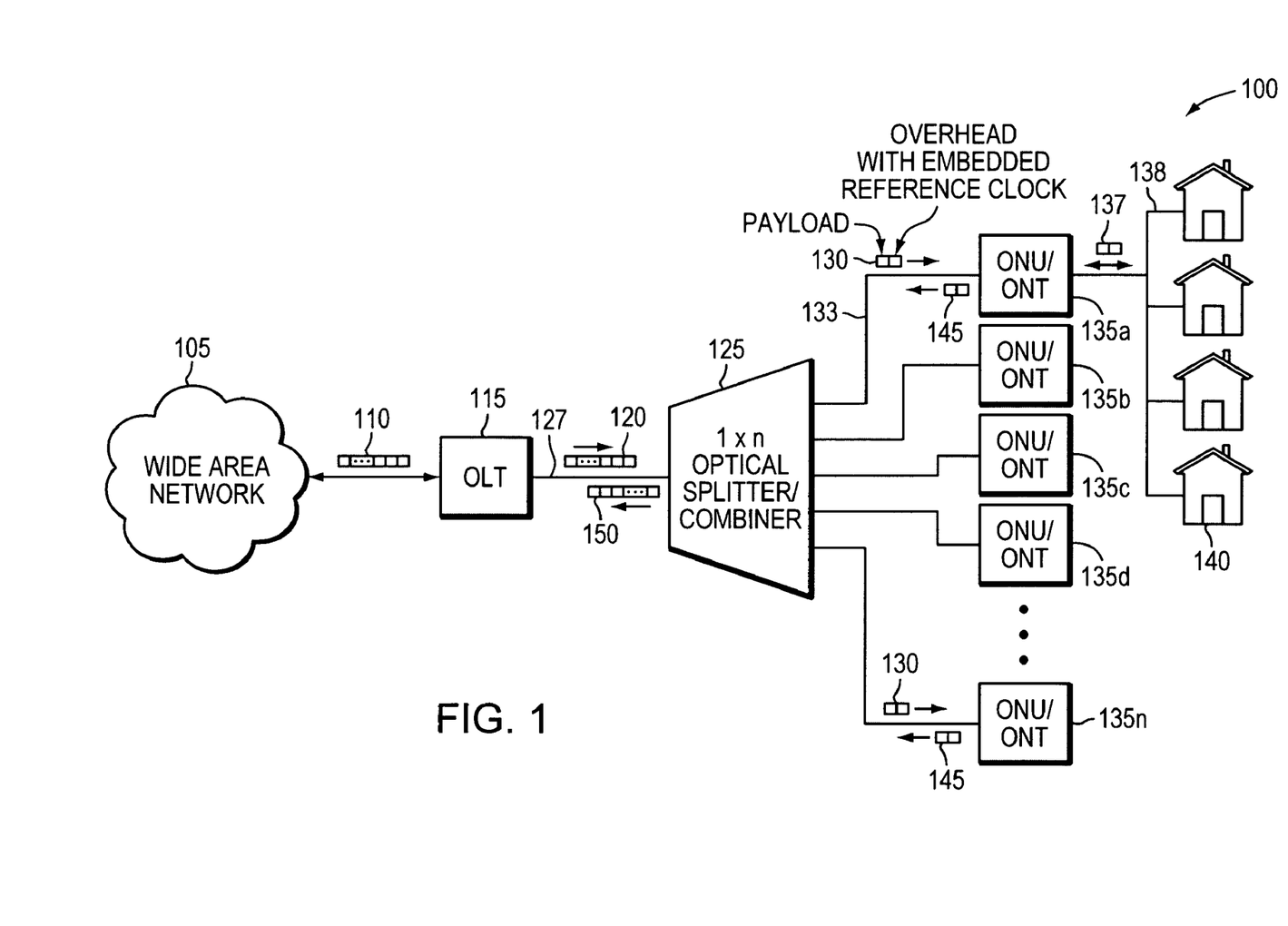
FIG. 1 is a network diagram of an example passive optical network (PON)

FIG. 1 is a network diagram of a passive optical network (PON) 100 illustrating aspects of an example embodiment of the invention. The network includes an optical line terminal (OLT) 115, an optical splitter/combiner (OSC) 125, and at least one optical network unit (ONU) or optical network terminal (ONT) 135a-135n (hereinafter both referred to as ONT). Data communications 110 may be transmitted between the OLT 115 and a wide area network (WAN) 105.

Communication of data transmitted between the OLT 115 and the ONTs 135a-135n may be performed using standard communication protocols known in the art. For example, point-to-multipoint (e.g., broadcast with IDs of intended recipients) for transmitting downstream data from the OLT 115 to the ONTs 135a-135n and point-to-point for transmitting upstream data from an individual ONT 135a-135n back to the OLT 115 (e.g., time division multiple access (TDMA)).

The PON 100 may be deployed for fiber-to-the-premise (FTTP), fiber-to-the-curb (FTTC), fiber-to-the-node (FTTN) and other fiber-to-the-x applications. The optical fiber 127, 133 in the PON 100 may operate at bandwidths such as 155 Mb/sec, 622 Mb/sec, 1.25 Gb/sec, and 2.5 Gb/sec or any other desired bandwidth implementation. The PON 100 may incorporate asynchronous transfer mode (ATM) communications, broadband services such as Ethernet access and video distribution, Ethernet point-to-multipoint topologies, native communications of data and time division multiplex (TDM) formats and other communications suitable for a PON. Customer premise equipment (e.g., 140) that can receive and provide communications in the PON 100 may include standard telephones (e.g., PSTN and cellular), Internet Protocol telephones, Ethernet units, video devices, computer terminals, digital subscriber line connections, cable modems, wireless access, as well as any other conventional customer premise equipment.

The OLT 115 generates or passes through downstream communications 120 to an OSC 125. After passing through the OSC 125, the downstream communications 130 are broadcast to the ONTs 135a-135n where each ONT 135a-135n reads data 130 intended for that particular ONT 135a-135n using, for example, identification information embedded within the communications signal. Data communications 137 may be further transmitted to and from, for example, a user's home 140 in the form of voice, data, video, and/or telemetry over copper, fiber or other suitable connection 138 as known to those skilled in the art. The ONTs 135a-135n transmit upstream communication signals 145 back to the OSC 125 via fiber connections 133. The OSC 125 in turn combines the ONT 135a-135n upstream communications signals 145 and transmits the combined signals 150 back to the OLT 115 using, for example, a TDM protocol. The OLT 115 may further transmit the communication signals 110 to a WAN 105.

Communications between the OLT 115 and the ONTs 135a-135n occur using a downstream wavelength and an upstream wavelength. The downstream communications from the OLT 115 to the ONTs 135a-135n may be provided at for example 622 megabytes per second, which is shared across all ONTs. The upstream communications from the ONTs 135a-135n to OLT 115 may be provided at for example 155 megabytes per second, which is shared among all ONTs 135a-135n connected to OSC 125.

Figure 2:
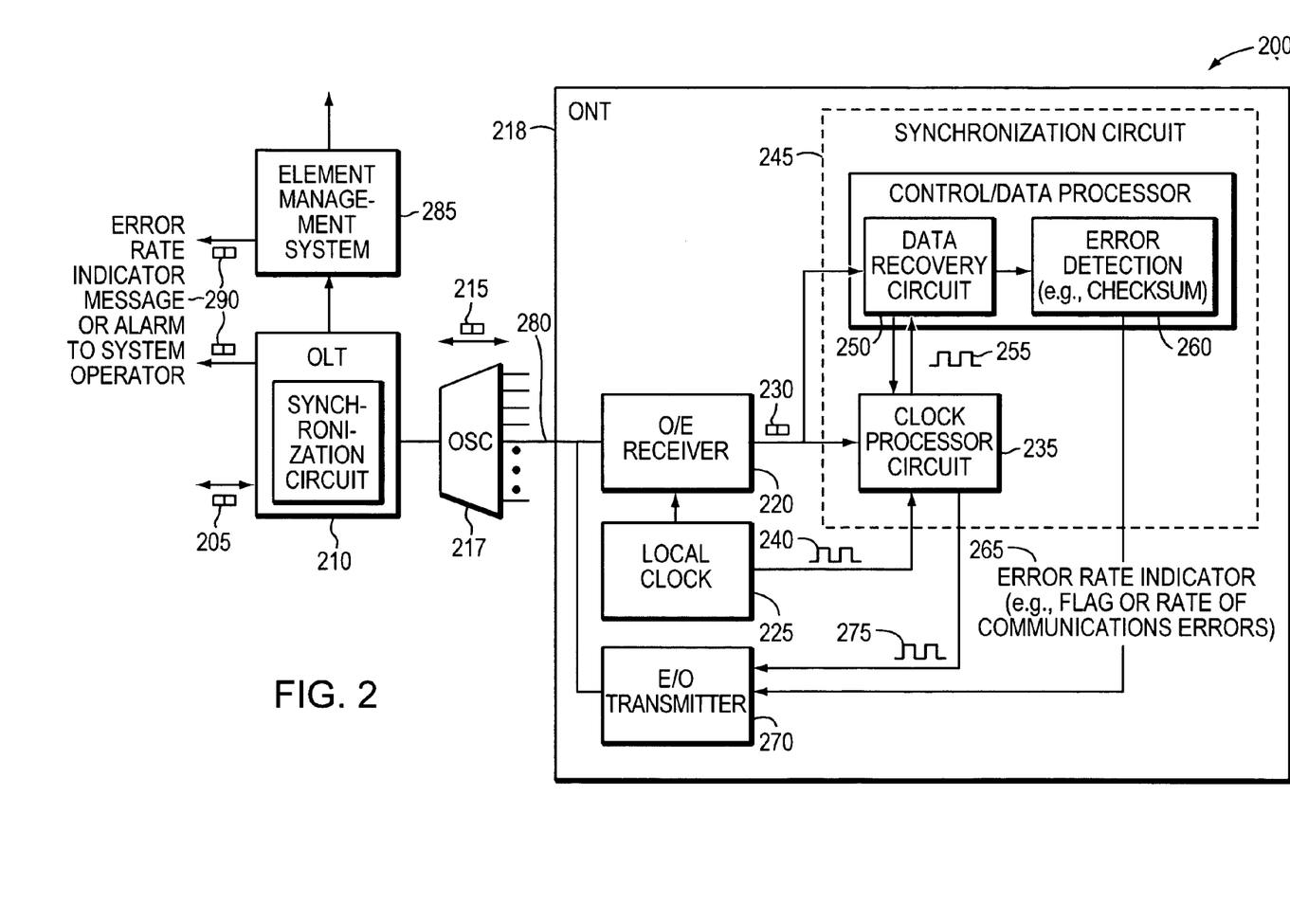
FIG. 2 is a block diagram illustrating communications between an optical line terminal (OLT) and optical network terminals (ONTs) in accordance with an example embodiment of the invention.

FIG. 2 is a detailed block diagram 200 of a PON according to an example embodiment of the invention. Communications between an OLT 210, an OSC 217, and an ONT 218 can be conducted in a same or similar manner similar to that as described in reference to FIG. 1. Communication signals 205 may be transmitted between the OLT 210 and a WAN (not shown). The OLT 210 transmits downstream communications signals 215 to the OSC 217. After the communications signals 215 propagate through the OSC 217, they are broadcast to the ONT 218 via a fiber connection 280. The signals 215 are received at the ONT 218 by an O/E receiver 220 where they are converted from optical to electrical. The O/E receiver 220 transmits the electrical signals 230 to a data recovery circuit (DRC) 250 and a clock processor circuit (CPC) 235 located within a synchronization circuit 245.

Data, clock, and other overhead information may be embedded in the communications signals 230. The CPC 235 extracts reference clock information embedded within the signals 230 received from the OLT 210. The CPC 235 may use a free-running clock signal 240 provided by a local clock 225 to create a regenerated local clock signal 255 based on the reference clock signal for use in processing downstream communications signals received from the OLT 210 and transmitting upstream communications signals 275 back to the OLT 210. The CPC 235 transmits the regenerated clock signal 255 to the DRC 250. The DRC 250 also extracts embedded data and other overhead information from the communications signals 230. Within the overhead information is an error detection signal, for example, a checksum. The data recovery circuit 250 may use the checksum to determine if the ONT 218 has correctly received the communications signals.

If an error is detected, an error detection unit 260 transmits an error signal 265 back to the OLT via an optical to electrical transmitter 270. The error rate indicator 265 may be transmitted back to the OLT 210 via a fiber connection 280. This signal may then be transmitted to, for example, a system operator (not shown), an element management system (EMS) 285, or other suitable reporting technique via signal 290.

Figure 3:
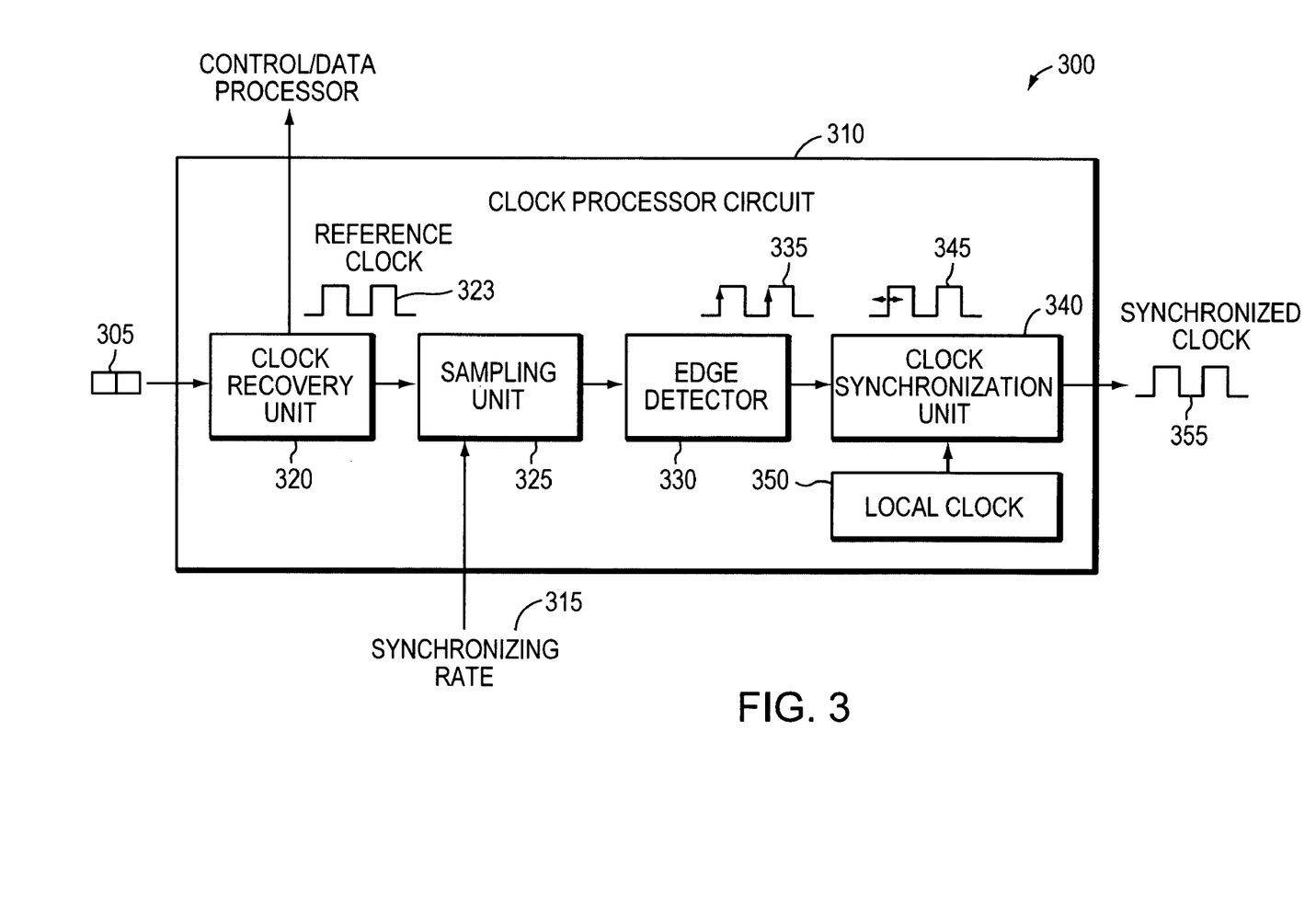
FIG. 3 is a block diagram of an example clock recovery unit.

FIG. 3 is a block diagram 300 of an example clock processor circuit (CPC) 310 such as the clock processor circuit 235 shown in FIG. 2. The clock recovery unit 320 receives a communications signal 305 in which an OLT (not shown) reference clock signal is embedded as data, optionally in an overhead or payload portion of the communications signal 305. Alternatively, the rate of receiving communications signals 305 may define the incoming reference clock 323. In the case of data contained within the communications signal, the reference clock 323 may be defined by a series of digital 1's and 0's in a row, with the series being as few as one. In the case of the rate of communications signals 305 defining the incoming reference clock 323, the clock recovery unit 320 may generate a series of digital 1's and 0's based on a rate of receipt of the communications signals 305. It should be understood that analog or other representations (e.g., Pulse Width Modulation (PWM)) may be used to represent the incoming reference clock 323.

The reference clock 323 is recovered and transmitted to the sampling unit 325 which samples the incoming reference clock signal 305. The sampling unit 325 may be, for example, an over-sampler using sampling techniques know in the art. The sampling unit 325 transmits the sampled results to an edge detector 330.

The edge detector 330 detects a rising edge of the reference clock signal 323 as shown in signal 335. Alternatively, the edge detector may be used to detect a falling edge of the reference clock signal 323. The edge detector 330 transmits the results to a clock synchronization unit 340 that may synchronize a local clock signal 350 with the recovered reference clock 323 by adjusting the edge of a local clock signal 350 as illustrated by timing signal 345. The rising edge of the recovered reference clock 323 and the local clock signal 350 are now synchronous with each other. The CPC 310 may then transmit the recovered clock signal 355 to an O/E transmitter and/or a data recovery circuit (not shown). A synchronization rate signal 315 may be used to control the rate at which the synchronization process occurs.

In an alternative embodiment, the OLT 210 may also contain a synchronization circuit 245. Thus, the OLT 210 and/or the ONT 218 may self-initiate the synchronization process allowing the local clocks to be synchronized with a reference clock. Further, the OLT may initiate and control the synchronization rate of the ONT and the ONT may initiate and control the synchronization rate of the OLT.

Figure 4A:
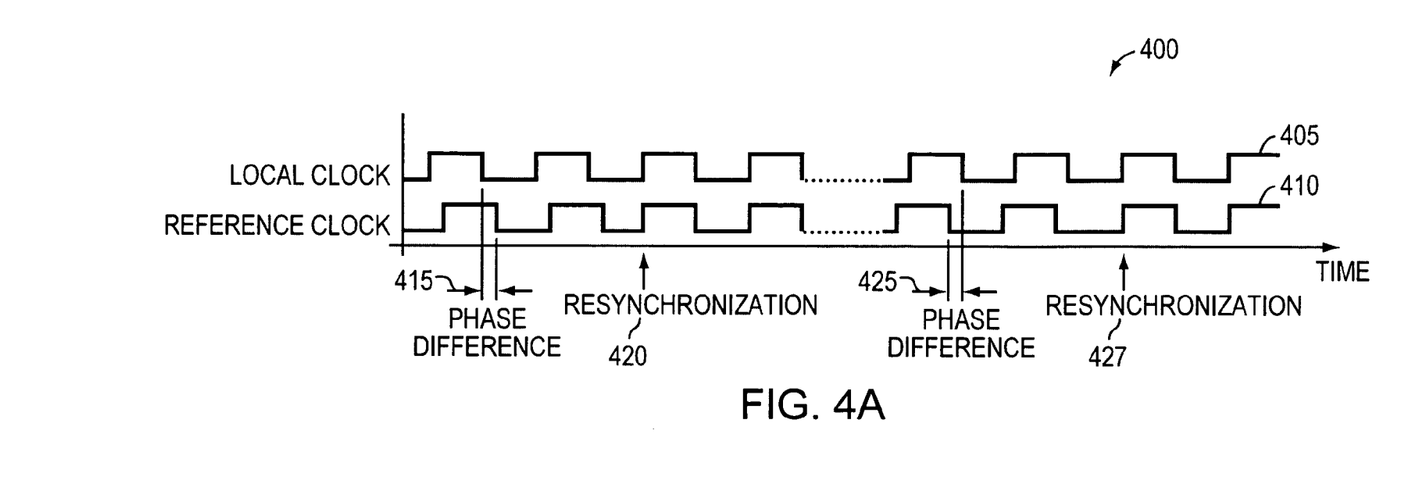
FIG. 4A is a timing diagram illustrating synchronizing a local clock with a reference clock in accordance with an example embodiment of the invention.

FIG. 4A is a timing diagram illustrating synchronizing a local clock signal 405 with a reference clock signal 410. The reference clock 410 is derived from information embedded within a signal received, for example, at the input of an ONT such as the ONT 218 shown in FIG. 2. The timing diagram illustrates a local clock and a reference clock out of phase with each other as shown in the phase difference 415. In this example, the local clock 405 leads the reference clock 410. A synchronization event depicted on the timing diagram at time 420 illustrates the local and reference clock signals after the synchronization process has completed. The edges of the reference clock 410 and the local clock 405 may be synchronized on rising edges or falling edges. Further, the local clock 405 may be the same frequency as the reference clock 410 or some other ratio thereof. Timing diagram 400 also illustrates the situation where the local clock 405 lags the reference clock 410 as shown by phase difference 425. A synchronization event shown on the timing diagram at time 427 illustrates how the clocks are again synchronized such that they are in phase with each other.

Figure 4B:
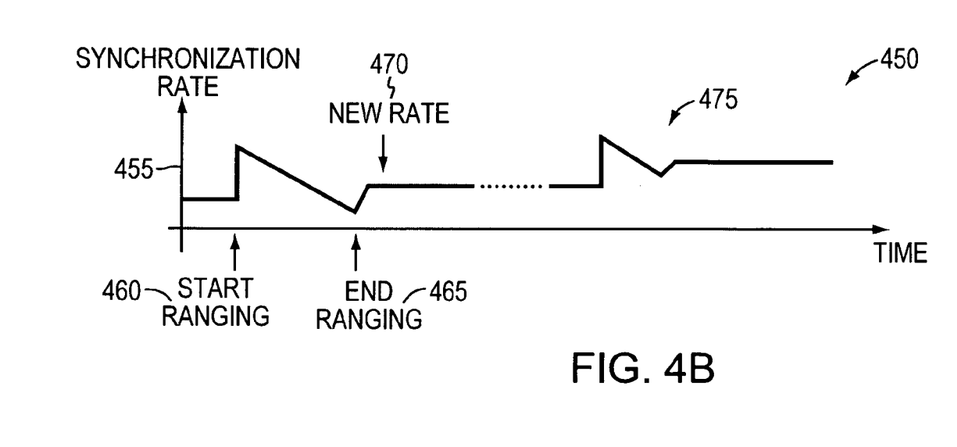
FIG. 4B is a timing diagram illustrating the synchronizing rate before, during, and after ranging in accordance with an example embodiment of the invention.

FIG. 4B is a timing diagram 450 illustrating the synchronization process in accordance with an example embodiment of the invention. The Y axis represents the synchronization rate 455 which is the rate (i.e., how often) the synchronization process runs. A start ranging command 460 may be issued by either the OLT, or the ONT (not shown). The ranging process may begin, for example, at a rate whereby the synchronization process occurs more frequently and then incrementally decreased until either end of ranging 465 is reached or an error occurs. A new rate 470 may then be applied, or, alternatively, reset to a default value. The synchronization rate may be set to run periodically or initiated by the system operator to, for example, troubleshoot errors or install/replace system components.

The synchronization process is repeated as shown in section 475 of the timing diagram. In this example, communications errors have occurred before the end of synchronization loop has been reached and, therefore, a higher synchronization rate is set. The increased synchronization rate enables the internode communications to tolerate increased levels of jitter. In existing systems, the synchronization rate is fixed and consequently, unable to detect and compensate for the increased clock jitter resulting in intermittent errors or total communications failures.

Figure 5:
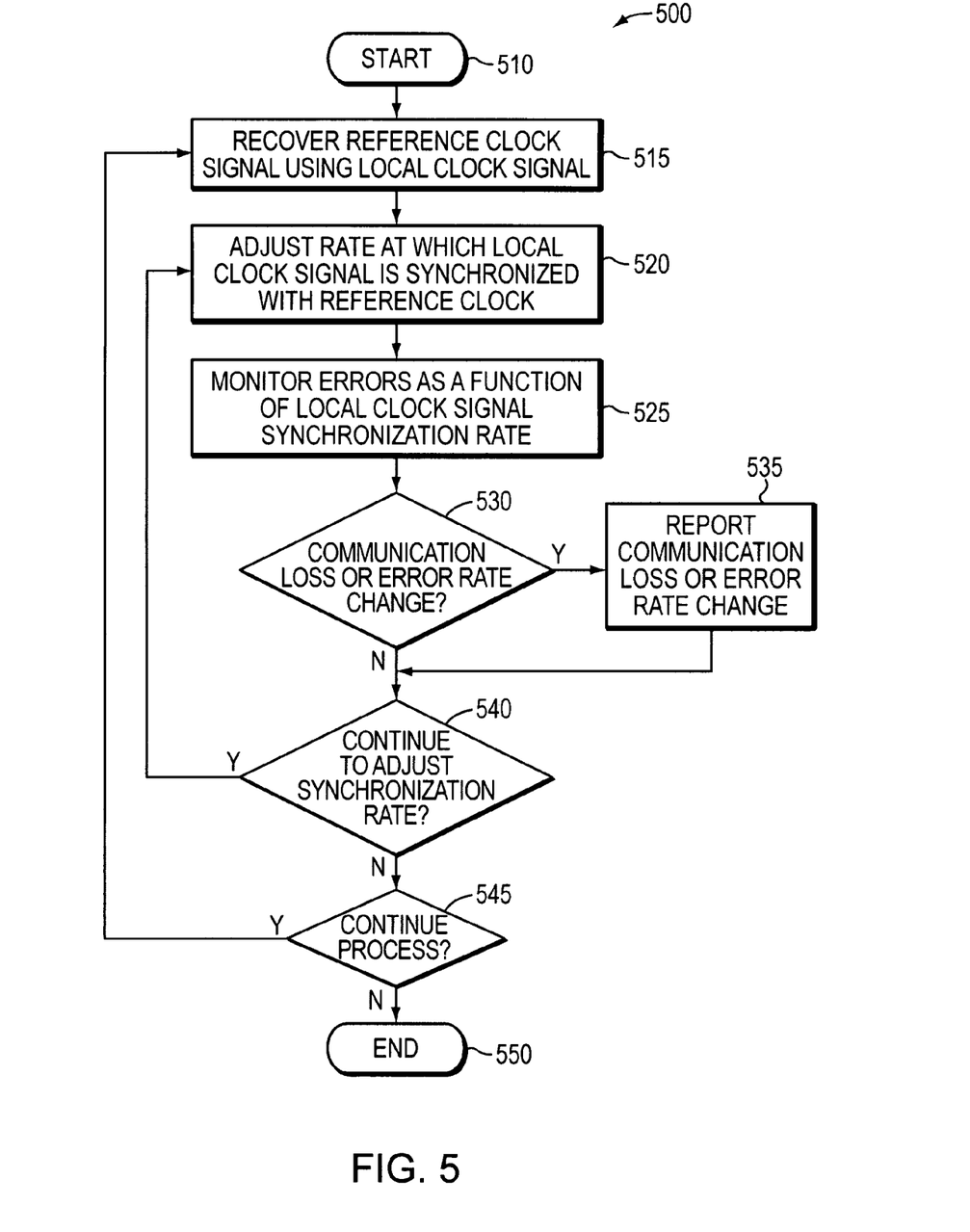
FIGS. 5 and 6 are flow diagrams of an example process performed in accordance with example embodiments of the invention.

FIG. 5 is a flow diagram of a process 500 illustrating an example embodiment of the invention. The process 500 begins (510) and may recover a reference clock signal associated with internode communications using a local clock signal (515). The process 500 may then adjust the rate at which the local clock signal is synchronized with the reference clock signal associated with the internode communications (520). The process 500 may then monitor whether a loss of communications or a change in a rate of communications errors of the internode communications occurs as a function of the rate of synchronizing the local clock signal (525). If a loss of communications or a change in the rate of communications errors occurs (530), the process 500 reports the loss of communications or error rate change that has occurred as a function of the rate of synchronizing the local clock signal (535) to, for example, a system operator. Next, the process 500 determines whether to continue adjusting the rate of synchronizing the local clock signal with the reference clock signal (540) and, if so, again adjusts the rate at which the local clock signal is synchronized with the reference clock (520). If not, the process 500 then determines whether to continue (545) recovering a reference clock signal associated with internode communications using a local clock signal (515), and if so, the process 500 repeats again. If not, the process 500 ends (550).

Figure 6:
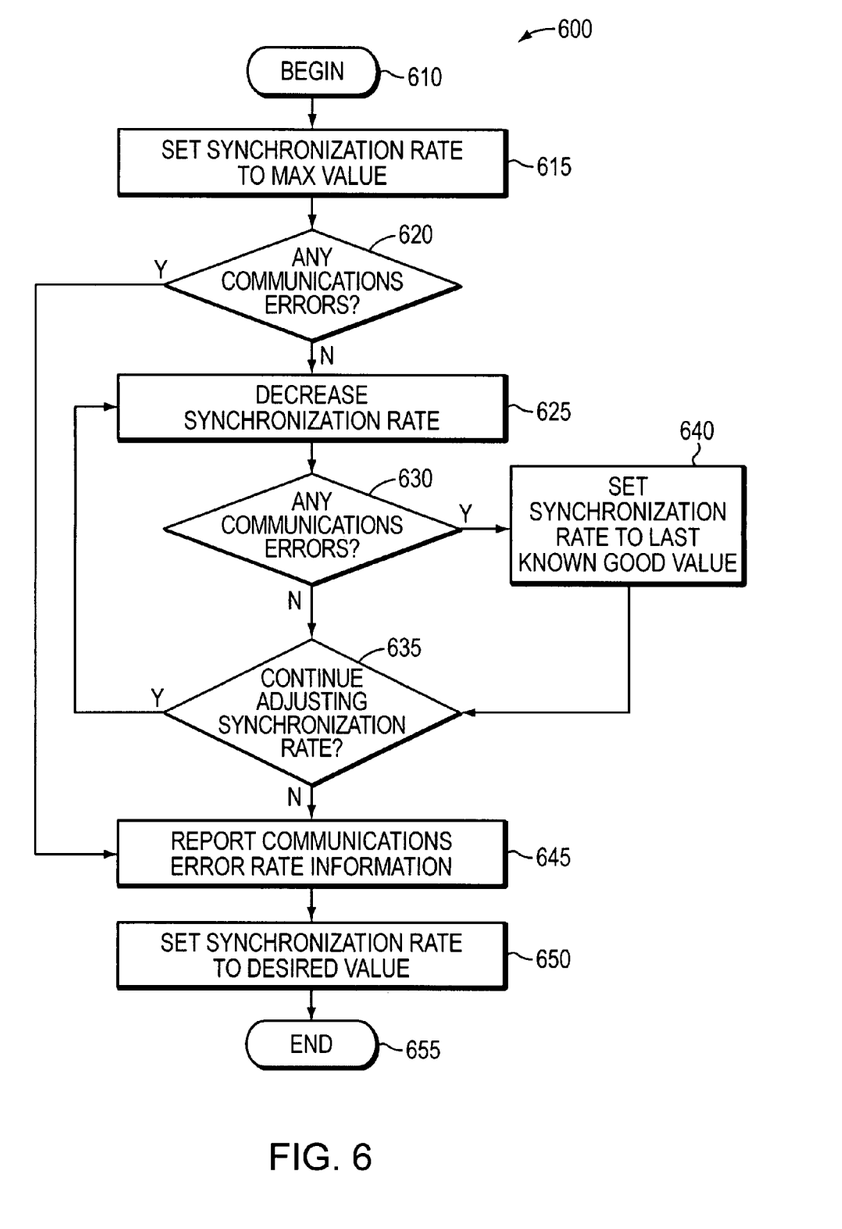

FIG. 6 is a flow diagram of a process 600 illustrating an example embodiment of the invention. The process 600 begins (610) and may set the synchronization rate (615) i.e., how often or fast the synchronization occurs, to a maximum value. A determination may be made as to whether there are any communications errors (620). If there are communications errors, there may be other problems since errors occurred with the synchronization rate set to the maximum value, therefore, error rate information may be reported (645) to, for example, a system operator or an element management system.

If there are no communications errors (620) the process 600 will incrementally decrease the synchronization rate (625). The synchronization rate may be adjusted using, for example, as a message in a PLOAM frame or an ONT management and control interface (OMCI). The process 600 then determines if there are any communications errors (630). If communications errors have occurred as a result of changing the synchronization rate, the synchronization rate is set to the last known value (640). If there are no communications errors, a check will be made to determine if the process 600 should continue (635) or is complete, such as when the minimum synchronization rate has been reached or when an error occurs. If the process 600 is not complete, the synchronization rate will be decreased again (625). However, if the process 600 is complete (635), any loss of communications or change in the rate of communications errors may be reported (645) back to a system operator or an element management system. After the error rate information has been reported (645), the synchronization rate may be set to a desired value (650), for example, the maximum value or some other value determined by the system operator or a default value, and the process 600 ends (655).

It should be understood that the process 600 described in FIG. 6 is an example embodiment used for illustrative purposes only. Other embodiments within the context of adjusting the synchronization rate may be employed. For example, the direction in which the synchronization rate is adjusted could be reversed such that the process 600 begins by setting the rate to a minimum value and incrementally increasing the rate while monitoring the error rate. In this situation, the process may fail until an acceptable rate is reached and may continue to pass until the maximum rate reached or the process stops. Furthermore, the techniques illustrated in FIG. 6 may be performed sequentially, in parallel or in an order other than that which is described. It should be appreciated that not all of the techniques described are required to be performed, that additional techniques may be added, and that some of the illustrated techniques may be substituted with other techniques.

Some or all of the steps in the process 600 may be implemented in hardware, firmware, or software. If implemented in software, the software may be (i) stored locally with the OLT, the ONT, or some other remote location such as the EMS, or (ii) stored remotely and downloaded to the OLT, the ONT, or the EMS during, for example, start 610. The software may also be updated locally or remotely. To begin operations in a software implementation, the OLT, the ONT, or EMS loads and executes the software in any manner known in the art.

It should be apparent to those of ordinary skill in the art that methods involved in the invention may be embodied in a computer program product that includes a computer usable medium. For example, such a computer usable medium may consist of a read-only memory device, such as a CD-ROM disk or convention ROM devices, or a random access memory, such as a hard drive device or a computer diskette, having a computer readable program code stored thereon.

While this invention has been particularly shown and described with references to example embodiments thereof, it will be understood by those skilled in the art that various changes in form and details may be made therein, in a computer program product or software, hardware or any combination thereof, without departing from the scope of the invention encompassed by the appended claims.

Further, although described in reference to a passive optical network, the same or other example embodiments of the invention may be employed in an active optical network, data communications network, wireless network (e.g., between handheld communications units and a base transceiver station), or any other type of communications network.

What is claimed is:

1. A method for synchronizing a local clock signal with a reference clock signal associated with communications between network nodes, the method comprising:
    recovering a reference clock signal associated with internode communications using a local clock signal;
    adjusting a rate of synchronizing the local clock signal with the reference clock signal associated with the internode communications;
    monitoring whether a loss of communications or a change in a rate of communications errors of the internode communications occurs as a function of the rate of synchronizing the local clock signal; and
    reporting a loss of communications or a change in the rate of communications errors occurring as a function of the rate of synchronizing the local clock signal.

2. A method as claimed in claim 1 wherein adjusting the rate of synchronizing includes decreasing the rate of synchronizing.

3. A method as claimed in claim 1 wherein adjusting the rate of synchronizing includes increasing the rate of synchronizing.

4. A method as claimed in claim 1 wherein adjusting the rate of synchronizing is self-initiated in a downstream node.

5. A method as claimed in claim 4 wherein the downstream node is an Optical Network Terminal (ONT) receiving the internode communications from an Optical Line Terminal (OLT).

6. A method as claimed in claim 1 wherein adjusting the rate of synchronizing is self-initiated in an upstream node.

7. A method as claimed in claim 6 wherein the upstream node is an Optical Line Terminal (OLT) receiving the internode communications from an Optical Network Terminal (ONT).

8. A method as claimed in claim 1 wherein adjusting the rate of synchronizing in one of the nodes includes adjusting the rate of synchronizing in response to a signal from the other node.

9. A method as claimed in claim 1 wherein, before ranging network nodes conducting the internode communications, increasing the rate of synchronizing, and, after ranging, decreasing the rate of synchronizing.

10. A method as claimed in claim 1 wherein reporting the loss of communications or change in the rate of communications errors includes transmitting a message or alert to a service provider.

11. A method as claimed in claim 1 wherein the reference clock signal is recovered from the internode communications.

12. A method as claimed in claim 1 wherein the reference clock signal is defined by a rate of receiving the internode communications.

13. An apparatus for synchronizing a local clock signal with a reference clock signal associated with communications between network nodes, the apparatus comprising:
   a clock processor circuit with a clock recovery unit and a clock synchronization unit configured, respectively, to recover the reference clock signal and to synchronize the local clock signal with the reference clock signal at a selectable rate to remove a phase or frequency difference between the local clock signal and the reference clock signal associated with communications between network nodes;
   a monitoring unit to monitor whether a loss of communications or a change in a rate of communications errors occurs as a function of the rate of synchronizing the local clock signal; and
   a reporting unit in communication with the monitoring unit to report whether a loss of communications or a change in a rate of communications errors occurs as a function of the rate of synchronizing the local clock signal.

14. An apparatus as claimed in claim 13 wherein the clock processor circuit further includes a sampling unit configured to decrease the rate of synchronization.

15. An apparatus as claimed in claim 13 wherein the clock processor circuit further includes a sampling unit configured to increase the rate of synchronization.

16. An apparatus as claimed in claim 13 wherein the clock processor circuit is configured to be responsive to a rate of synchronization adjusted in a downstream node.

17. An apparatus as claimed in claim 16 wherein the downstream node is an Optical Network Terminal (ONT) configured to receive internode communications from an Optical Line Terminal (OLT).

18. An apparatus as claimed in claim 13 wherein the clock processor circuit is configured to be responsive to a rate of synchronization adjusted in a upstream node.

19. An apparatus as claimed in claim 18 wherein the upstream node is an Optical Line Terminal (OLT) configured to receive internode communications from an Optical Network Terminal (ONT).

20. An apparatus as claimed in claim 13 wherein the clock processor circuit of one node is configured to adjust the rate of synchronization in response to a signal from another node.

21. An apparatus as claimed in claim 13 wherein the clock processor circuit is configured to increase the rate of synchronization before ranging network nodes conducting the internode communications and decrease the rate of synchronization after ranging.

22. An apparatus as claimed in claim 13 wherein the reporting unit is configured to report the loss of communications or change in the rate of communications errors via a message or alert to a service provider.

23. An apparatus as claimed in claim 13 wherein the reference clock signal is recovered from data contained within the internode communications.

24. An apparatus as claimed in claim 13 wherein the reference clock signal is defined by a rate of receiving the internode communications.

* * * * *